United States Patent [19]

Baylor

[11] 4,426,091
[45] Jan. 17, 1984

[54] TRACK JOINT SEAL ASSEMBLY WITH INTERLOCKED THRUST RING

[75] Inventor: John M. Baylor, Bettendorf, Iowa

[73] Assignee: J. I. Case Company, Racine, Wis.

[21] Appl. No.: 376,755

[22] Filed: May 10, 1982

[51] Int. Cl.³ .......................... F16J 15/38; F16J 15/32
[52] U.S. Cl. ......................................... 277/83; 277/84;
277/92; 277/95; 277/166; 277/186; 305/11
[58] Field of Search ...................... 277/83, 84, 92, 95,
277/152, 166, 181, 186; 305/11-13

[56] References Cited
U.S. PATENT DOCUMENTS

| | | | |
|---|---|---|---|
| 2,509,436 | 5/1950 | Isenbarger | 305/11 X |
| 3,195,906 | 7/1965 | Moyers | 277/166 X |
| 4,179,130 | 12/1979 | Fass et al. | 277/84 |
| 4,183,542 | 1/1980 | Quartara | 277/92 |
| 4,204,716 | 5/1980 | Baylor | 305/11 |
| 4,256,316 | 3/1981 | Reinsma | 277/186 X |

FOREIGN PATENT DOCUMENTS 591522 8/1947 United Kingdom .................. 277/83

Primary Examiner—Robert S. Ward
Attorney, Agent, or Firm—Dressler, Goldsmith, Shore, Sutker & Milnamow, Ltd.

[57] ABSTRACT

A seal arrangement for use in a track joint having a track pin and a cylindrical bushing on the pin and two track links. The end of the bushing and one of the track links present annular surfaces faced toward each other and spaced apart. The seal arrangement includes a seal ring of elastomer material and a thrust ring of rigid material. The seal ring has a body portion and two radially outwardly extending leg portions which contact the annular surfaces. The thrust ring is molded into the body portion of the seal ring and includes a plurality of cooperating axial recess portions and radial recess portions formed therein. The elastomer material of the seal ring extends into and fills the recess portions so as to form circumferentially spaced integral link portions around the thrust ring.

8 Claims, 7 Drawing Figures

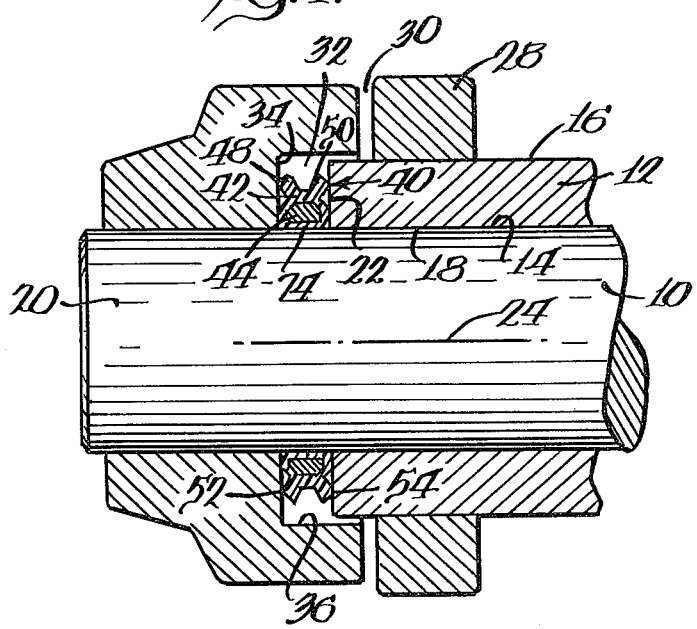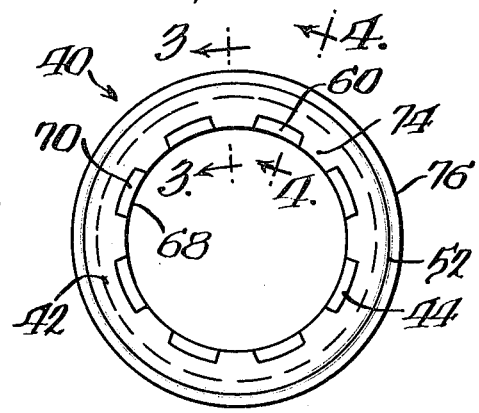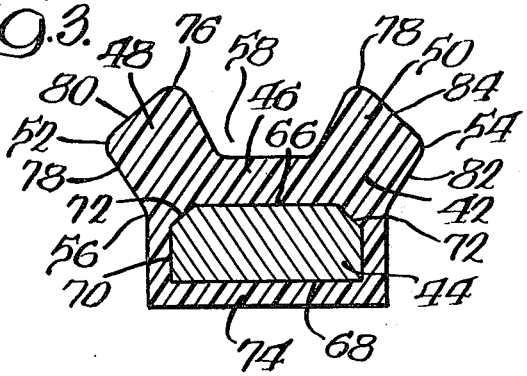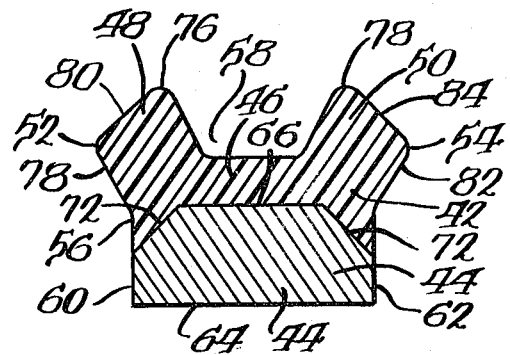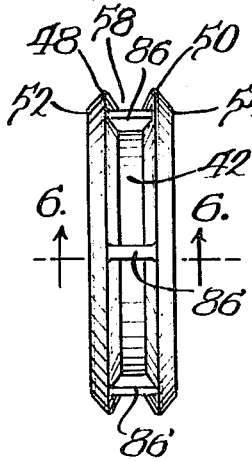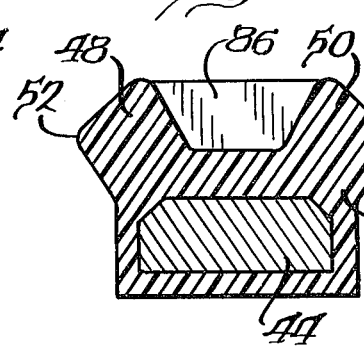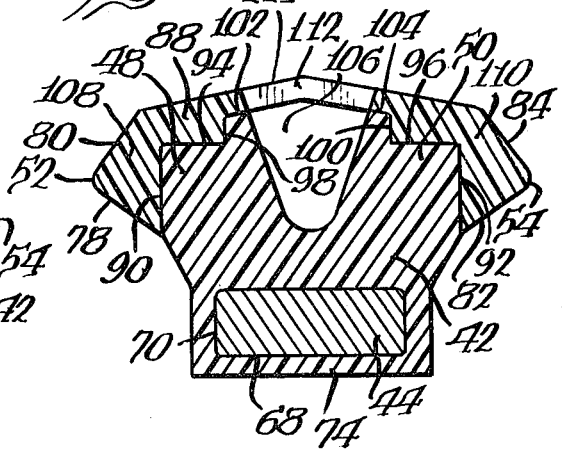

TRACK JOINT SEAL ASSEMBLY WITH INTERLOCKED THRUST RING

BACKGROUND OF THE INVENTION

This invention relates to a seal arrangement, and more particularly, to a seal arrangement for use in a track joint of the type used in a track chain on crawler tractors.

The prior art is already aware of various arrangements of track joints for crawler tractors, and those joints typically include separate thrust rings and seal rings. The purpose of such joints is to have a sturdy joint which is sealed against the entry of dirt and the like so that the joint can remain clean and functional with only a minimum of friction and wear. Examples of the prior art utilizing a rigid thrust ring and a separate elastomer seal member or the like are found in U.S. Pat. Nos. 3,841,718 and 4,030,730 and 4,062,550 and 4,094,516 and 4,195,852 and 4,204,716 and 4,209,204.

In my U.S. Pat. No. 4,204,716, assigned to the assignee of this invention, a highly effective seal arrangement for a track link is disclosed. As shown therein, the seal arrangement includes a thrust ring and a seal ring secured thereto. The two rings extend in axial abutment between two annular surfaces presented by the track joint. Thus, in that instance, the thrust ring maintains the annular surfaces spaced apart, and the seal ring is effective between those annular surfaces to preclude the entry of foreign material, such as dirt and dust, and thus the joint is stable and secure and it is also kept clean.

The present invention is an improvement on the seal arrangement of the general type disclosed in U.S. Pat. No. 4,204,716. Among the objectives of the invention is to provide a seal arrangement which includes means for axially and radially loading the sealing leg portions, while maintaining the leg portions in tension so as to provide sufficient load and memory when installed in a predetermined operating width or confining space. Another objective is to provide such a seal arrangement which eliminates the need for a separate seal thrust ring and provides one-piece symmetry for easy installation.

SUMMARY OF THE INVENTION

These and other objectives are realized in accordance with the embodiments of the invention which will hereinafter be specifically disclosed.

Briefly stated, the invention comprises a seal arrangement comprising first and second axially spaced members mounted for relative rotation about a common axis, and defining first and second axially facing annular surfaces. A seal ring of elastomer material is fitted between and in abutting contact with the first and second annular surfaces. The seal ring has an annular body portion and two radially outwardly extending leg portions, having a radial extent less than that of the first and second annular surfaces, to be disposed within the radial limits of the annular surfaces. The leg portions have circular edges at the axially opposite ends of the seal ring which are in respective compressed contact with the first and second annular surfaces for sealing contact therewith. A thrust ring of rigid material is molded into the body portion of the seal ring. The thrust ring has a radial extent less than the radial extent of the body portion. A plurality of cooperating axial recess portions and radial recess portions are formed in the thrust ring. The elastomer material of the seal ring extends into and fills such recess portions so as to form circumferentially spaced integral link portions around portions of the thrust ring. These link portions cooperate with the thrust ring to axially and radially load the sealing leg portions of the seal ring. The link portions also maintain the thrust ring in rigid contact with the body portion of the seal ring.

An alternate embodiment of the invention includes a plurality of circumferentially spaced bridge portions which extend between the leg portions of the seal ring to absorb axial movement of the circular edges thereof. Another alternate embodiment includes a urethane seal face to increase the wear of the seal assembly.

BRIEF DESCRIPTION OF THE DRAWINGS

FIG. 1 is a sectional view of a portion of a track chain joint incorporating a first preferred embodiment of the invention;

FIG. 2 is an end elevational view of a first preferred embodiment of a seal arrangement in accordance with the invention;

FIG. 3 is a sectional view taken along the line 3—3 of FIG. 2;

FIG. 4 is a sectional view taken along the line 4—4 of FIG. 2;

FIG. 5 is a side elevational view of a second preferred embodiment of a seal arrangement in accordance with the invention;

FIG. 6 is a sectional view taken along line 6—6 in FIG. 5; and

FIG. 7 is a sectional view of a portion of a third preferred embodiment of a seal arrangement in accordance with the invention.

DESCRIPTION OF PREFERRED EMBODIMENTS

FIG. 1 shows a portion of one end of one joint of a track chain of the type used in a crawler tractor, such as more fully shown in my U.S. Pat. No. 3,948,574, and as readily understood by anyone skilled in the art. A track pin 10 is of the usual cylindrical configuration, and a cylindrical bushing 12 is piloted thereon and mates with the pin 10 along the line designated 14, which is the exterior circumference line of the pin 10. Thus, the bushing 12 is cylindrical and has an outer surface 16 and an inner circular surface 18 which surrounds the pin 10 and snugly extends thereover and terminates short of the very end 20 of the pin 10, since the bushing 12 terminates in an end surface 22 which is a planar surface disposed on a plane transverse to the longitudinal axis designated 24 of the assembled pin 10 and bushing 12.

It will therefore be understood that the bushing 12 is free to rotate on the pin 10, though the bushing is relatively snug on the pin 10 and extends only over the intermediate length of the pin 10, which therefore has an extending end 20 projecting beyond the bushing end surface 22. Thus, there could be lubrication introduced into the track joint and between the pin 10 and bushing 12, if desired. Also, a conventional type of track chain link 26 is pressed onto the pin end 20 and extends completely therearound, and there is also a track link 28 which is pressed onto the bushing outer circumference 16 and extends therearound. It will be noticed that the links 26 and 28 define a space 30 therebetween, and the two links are thus arranged to rotate relative to each other about the axis 24 for the usual articulation of the track chain. As such, the link 26 is the outer link and the link 28 is the inner link of the track chain. The construction described heretofore is a conventional construction.

The present invention provides a combination thrust ring and a seal member which adapts to and accommodates the conventional construction described heretofore. The track chain parts described present an annularly shaped cavity or counterbore 32 which is defined by the bushing end surface 22 and the track link end surface 34. These two annular surfaces are faced toward each other and are parallel to each other and are transverse to the longitudinal axis 24, all for presenting the space 32 therebetween. Also, the link 26 has a circular surface 36 which defines the outer circular limit of the space 32.

Referring to FIGS. 1-4, a first preferred embodiment of the seal arrangement of the present invention is indicated generally at 40. Seal 40 is an annular member which is press fitted around pin 10 and is positioned in cavity 32. Seal 40 serves the dual function of cooperating with the link members 26 and 28 to form a sturdy joint and cooperating with the annular surfaces 22 and 34 to prevent entry of dirt and the like into the joint so that the joint can remain clean and functional with only a minimum of friction and wear.

Seal 40 is an integrally molded annular unit which includes a seal ring member 42 and a thrust ring member 44. Seal ring 42 is an annular shaped member fabricated from an elastomer material and is therefore pliable and flexible to serve as a dirt and lubricant seal member. Seal ring 42 has a body portion 46, which is affixed to thrust ring 44 in a manner which will hereinafter become more apparent. Seal ring 42 has two radially outwardly extending leg portions 48 and 50 which diverge outwardly and away from each other and which are formed integrally with body portion 46. As best seen in FIGS. 3 and 4, leg portions 48 and 50 define respective circular seal edges 52 and 54. It will be further noticed that the axial length of body portion 46 is shown to be less than the axial length of the thrust ring 44, and there is thus formed an indentation designated at 56 on the seal ring 42. This assures that the leg portions 48 and 50 will sufficiently flex and adjust themselves to have the seal edges 52 and 54 in compressed and thus sealing contact with the respective surfaces 22 and 34 when positioned in cavity 32. Also, with this relationship, the leg portions 48 and 50 are free to flex and stretch in response to the relative rotational movement of the bushing 12 and the link 26 about their common axis 24, during the articulation of the track chain. Accordingly, the seal ring 42 remains in efficient and snug sealing contact with the annular surfaces 22 and 34 and thus precludes the entry of dust and dirt into the track chain and radially inwardly of the seal ring 42 to therefore protect the pin 10 and bushing 12 from having dirt get to the surface line designated 14.

The leg portions 48 and 50 define a space or groove 58 therebetween, which also accommodates the flexing of the leg portions towards and away from each other for the self-adjustment and accommodation of the seal ring 42 relative to surfaces 22 and 24. As seen in FIG. 1, the seal ring 42 is arranged both in the configuration shown and described and in the elasticity of the material used therein, such that the sealing edges 52 and 54 become somewhat flattened and compressed against the surfaces 22 and 34 to thereby provide a complete and high pressure seal at those surfaces, all as desired and as mentioned herein.

As alluded to hereinabove, thrust ring 44 is molded into body portion 46 of seal ring 42. Thrust ring 44 has two opposing end surfaces 60 and 62, which are in facing relationship to surfaces 22 and 34, an inner surface 64, in facing relationship to pin 10, and an outer surface 66 in facing relationship to body portion 46 of seal ring 42. Thrust ring 44 is fabricated from a rigid material such as sintered metal or the like.

In accordance with a feature of the invention, a plurality of axially extending recesses 68 are formed in surface 64 of thrust ring 44. Recesses 68 are preferably spaced equadistant about the periphery of surface 64. Also, a plurality of radially extending recesses 70 are formed in end surfaces 60 and 62 in axial alignment with and cooperation with each axial recess 68. The intersection between the respective end surfaces 60 and 62 and the outer surface 66 are preferably bevelled as indicated at 72 to minimize stress risers within the seal ring 42. Thrust ring 44 can be a machined part or more economically, a sintered metal part which can be die formed to provide recesses 68 and 70.

Seal 40 is fabricated or molded such that the elastomeric material of seal ring 42 fills the recesses 68 and 70 and thereby flows together so as to form bridge or link portions 74. Link portions 74 serve the dual purpose of retaining the thrust ring 44 in fixed relation to seal ring 42 and to provide a means for axially and radially loading the sealing edges 52 and 54, in a manner which will be hereinbelow further discussed. Although not presently considered necessary, a bonding agent may be provided to further ensure the retension of thrust ring 44 to seal ring 42.

As already alluded to hereinabove, and as seen in FIGS. 2-4, the axial length of the seal ring 42 between its circular edges 52 and 54, in the free body or unassembled form, is greater than the axial length between the thrust ring end surfaces 60 and 62. Therefore, the compression of the seal ring 42 between surfaces 22 and 34 is assured and the desired sealing efficiency is achieved. It should further be noted, that, the circular edges 52 and 54 are formed by the angles shown at the extending legs 48 and 50, such that the edges 52 and 54 lie on a circle of lesser diameter than that of the full extent of the seal ring 46 as defined by the circular edges 76 and 78, and they are therefore line edges for high pressure contact with the annular surfaces 22 and 34 for effective sealing. That is, the edges 52 and 54 are each located at the juncture of, and are formed by, those angles defined by corresponding surfaces 78 and 80 and 82 and 84, which are bevel surfaces extending axially inwardly on seal ring 46, from respective edges 52 and 54, and oblique to the longitudinal axis of the seal ring 46. The edges 52 and 54 are thus spaced radially inwardly from the radial outer limit of seal ring 46, such that there is the stock of the seal ring 46 extending beyond the edges 52 and 54 to be supportive of the edges 52 and 54, and therefore the edges 52 and 54 can be firmly compressed against the surfaces 22 and 34. Also, the legs 48 and 50 can be twisted in opposite rotational directions to each other in response to the relative rotation between the bushing 12 and the link 26. The link portions 74, which fill recesses 68 and 70, are in tension whenever the seal ring 46 is confined in a narrower space than its free height and, therefore, in such instances the edges 52 and 54 are preloaded in both the axial and radial direction. This relationship is effective to maintain the elastomer of the seal ring 46 in tension and provides sufficient load and memory when installed in confining space 32. Further, the intermittent axial alternating metal and elastomer in contact with pin 10 provides a metal surface to relieve the elastomer.

Referring to FIGS. 5 and 6, a second preferred embodiment of the invention is shown which incorporates all of the features of the first embodiment shown in FIGS. 1-4. This embodiment is of identical construction to the first embodiment with the addition of a plurality of axially extending bridge portions 86 extending between the legs 48 and 50 in space 58. Bridge portions 86 are formed from the elastomer material of seal ring 46 and are preferably circumferentially space in radial alignment with each of the link members 74. Bridge portions 86 provide additional means to absorb axial movement of the legs 48 and 50 and to further load the sealing edges 52 and 54 outward against the surfaces 22 and 34.

Referring to FIG. 7, a third preferred embodiment of the invention is shown which incorporates many of the features of the first and second preferred embodiments. This embodiment incorporates the same seal ring and thrust ring relationship as that disclosed in regard to the first embodiment. Corresponding portions have been designated by the same reference numeral as used in FIGS. 1-6. The seal ring of this embodiment is modified to accept a seal face ring, indicated at 88, which is constructed of a relatively rigid abrasion resistant material such as urethane or the like. The purpose of providing such a seal face ring to contact the surfaces 22 and 34, is to reduce the wear of the sealing faces, inherent with the operation of the seal arrangement.

As is apparent from FIG. 7, the legs 48 and 50 are modified from that of the first and second embodiment to receive and retain the seal face ring 88. Legs 48 and 50 are respectively provided with radially extending annular surfaces 90 and 92, which are in facing relationship to corresponding surfaces 22 and 34. Surfaces 90 and 92 extend outward and respectively terminate in inwardly extending axial surfaces 94 and 96. Surfaces 94 and 96 extend inwardly towards one another and terminate in radially outwardly extending surfaces 98 and 100, which are substantially parallel to surfaces 90 and 92 and positioned axially inwardly and radially outwardly therefrom. Surfaces 98 and 100 respectively terminate in generally axial surfaces 102 and 104, which extend towards space or groove 106 between legs 48 and 50. Space 106 corresponds in function to space 58 in the first and second embodiments.

Seal face ring 88 is formed to have portions 108 and 110, which have inner surfaces which cooperate and mesh with the above defined surfaces of legs 48 and 50. Seal face ring 88 is suitably bonded to legs 48 and 50 along such surfaces. Portions 108 and 110 are separated by a space, indicated at 112, which communicates with space 106. Portions 108 and 110 are formed to define edges 52 and 54 by outer surfaces which correspond to the surfaces 78, 80, 82 and 84 of the first embodiment, and are accordingly numerically designated the same in FIG. 7.

Seal face ring 88 can be fabricated of two separate pieces corresponding to portions 108 and 110 or, preferably, may be fabricated as a single piece which is interconnected by circumferentially spaced angled tie straps portions 114 which connect the portions 108 and 110 together. The tie straps 114 facilitate the positioning of the seal face 80 in the mold during fabrication and they buckle upward when the seal arrangement is preloaded to operating height. The operation of the seal arrangement of this embodiment is substantially identical to that of the first embodiment.

It is thus apparent that the embodiments of the present invention provide an effective and extremely compact seal assembly for a severe service environment such as is found in a rotary track joint, but which seal assembly would be useful in a variety of other applications as well. It is simple and reliable in construction and provides means for preloading the sealing faces in both the axial and radial directions. The seal assembly is symmetrical about a center plane extending transverse to its central axis and, therefore, the installer of such seal assembly need not concern himself with the directional installation thereof.

Since various changes and modifications of the invention as illustrated and described with regard to the preferred embodiments illustrated and described herein will occur to and can be made readily by those skilled in the art, without departing from the invention concept, the invention is not to be taken as limited except by the reasonable scope of the appended claims.

What is claimed is:

1. In a seal assembly including first and second axially spaced members mounted for relative rotation about a common axis, the first member having a counterbore formed in one face so as to define a first annular surface, the second member having a second annular surface, said first and second annular surfaces being spaced apart and faced toward each other on respective planes transverse to the common axis of rotation, an improved seal arrangement positioned between and in abutting contact with said first and second annular surfaces, comprising: a seal ring of elastomer material positioned in said counterbore between and in abutting contact with said first and second annular surfaces, said seal ring having an annular body portion and two radially outwardly extending leg portions having a radial extent less than that of said first and second annular surfaces, said leg portions having circular edges at the axially opposite ends of said seal ring which are in respective compressed contact with said first and second annular surfaces for sealing therewith; and a thrust ring of rigid material formed within said body portion of said seal ring, said thrust ring having a radial extent less than the radial extent of said body portion of said seal ring, said thrust ring having a plurality of circumferentially spaced axial recess portions formed in an inner surface thereof such that the elastomer material of said seal ring extends into and fills said axial recess portions.

2. In a track joint having a track pin, a cylindrical bushing on said track pin and terminating in a first annular surface disposed on a plane transverse to the extent of and within the length of said track pin, and a track link on the end of said track pin and having a second annular surface, said first and second annular surfaces being spaced apart and faced toward each other and extending radially from and beyond said track pin on respective planes transverse to the longitudinal axis of said pin; an improved seal arrangement on said track pin between and in abutting contact with said first and second annular surfaces, comprising: a seal ring of elastomer material fitted on said track pin between and in abutting contact with said first and second annular surfaces, said seal ring having an annular body portion and two radially outwardly extending leg portions having a radial extent less than that of said first and second annular surfaces to be disposed within the radial limits of said annular surfaces, said leg portions having circular edges at the axially opposite ends of said seal ring which are in respective compressed contact with said first and second annular surfaces for sealing therewith; and a thrust ring of rigid material formed within said body portion of said seal ring, said thrust ring having a radial extent less than the radial extent of said body portion of said seal ring, said thrust ring having a plurality of circumferentially spaced axial recess portions formed in an inner surface thereof in facing relationship to said track pin such that the elastomer material of said seal ring extends into and fills said axial recess portions.

3. In a seal assembly including first and second axially spaced members mounted for relative rotation about a common axis, the first member having a counterbore formed in one face so as to define a first annular surface, the second member having a second annular surface, said first and second annular surfaces being spaced apart and faced toward each other on respective planes transverse to the common axis of rotation; an improved seal arrangement positioned between and in abutting contact with said first and second annular surfaces, comprising: a seal ring of elastomer material positioned in said counterbore between said first and second annular surfaces, said seal ring having an annular body portion and two radially outwardly extending leg portions; a seal face ring positioned around said leg portions and having a circular edge at the axially opposite ends thereof which are in respective compressed contact with said first and second annular surfaces, said seal face ring being of relatively rigid abrasion resistant material; and a thrust ring of rigid material formed within said body portion of said seal ring, said thrust ring having a radial extent less than the radial extent of said body portion of said seal ring, said thrust ring having a plurality of circumferentially spaced axial recess portions formed in an inner surface thereof such that the elastomer material of said seal ring extends into and fills said axial recess portions.

4. The invention as defined in claims 1, or 2, or 3 wherein said thrust ring has a plurality of spaced radial recess portions formed in the respective edges thereof in radial alignment with said axial recess portions and the elastomer material of said seal ring extends into and fills said radially recess portions so as to form integral link portions around said thrust ring.

5. The invention as defined in claims 1 or 2 wherein a plurality of circumferentially spaced bridge portions extend between said leg portions to absorb axial movement of said circular edges.

6. The invention as defined in claims 1, or 2, or 3 wherein said circular edges are spaced radially inwardly from the radial outer limit of said seal ring and are disposed on respective planes beyond the planes of the axial ends of said thrust ring, in the free body condition of said seal ring, for effecting the compressed contact with said annular surfaces.

7. The invention as defined in claims 1 or 2 wherein said circular edges are each located at the juncture of and defined by two surfaces faced axially of said seal ring and oblique to the longitudinal axis of said seal ring.

8. The invention as defined in claim 3 wherein said seal face ring defines an open space in facing relationship between said leg portions and a plurality of axial tie straps are circumferentially spaced across said open space.

* * * * *